United States Patent [19]
Bajat et al.

[11] Patent Number: 5,270,961
[45] Date of Patent: Dec. 14, 1993

[54] STEPPER MOTOR SIMULATOR DEVICE

[75] Inventors: Thierry Bajat, Mandelieu; Jean-Jacques Digoin, Les Adrets, both of France

[73] Assignee: Aerospatiale Societe Nationale Industrielle, France

[21] Appl. No.: 694,925

[22] Filed: May 2, 1991

[30] Foreign Application Priority Data

May 2, 1990 [FR] France .................. 90 05535

[51] Int. Cl.[5] .............................................. G06J 1/00
[52] U.S. Cl. ..................................................... 364/602
[58] Field of Search .............. 364/602, 607, 608, 718, 364/775; 318/696

[56] References Cited
U.S. PATENT DOCUMENTS 4,587,473  5/1986  Turvey ............................ 318/696
5,008,607  4/1991  Ono et al. ........................ 318/696

*Primary Examiner*—Long T. Nguyen
*Attorney, Agent, or Firm*—Remy J. VanOphem

[57] ABSTRACT

A control low simulator device for testing a stepper motor with N windings. The device has a digital signal generator stage constituted by a computation unit having a central unit to which are connected an input/output peripheral device module for use by a user, a memory module and a clock module of frequency f. A plurality of at least N identical triggerable memory units are connected in parallel to the computation unit and controlled by the clock module and each drive an identical digital-to-analogue converter. The memory units are adapted to contain cyclic sequences of m signal values of period n, substantially identical from one memory unit to another except for an offset representing one step. The control low simulator device also has an analogue power or driver stage constituted by a plurality of N identical voltage/current converters, each connected to the output of a digital-to-analogue converter and adapted to have its output connected to one winding of the stepper motor, to apply thereto a signal of frequency f/n.

18 Claims, 14 Drawing Sheets

STEPPER MOTOR SIMULATOR DEVICE

BACKGROUND OF THE INVENTION

1. Field of the Invention

The invention concerns the control of stepper motors, especially stepper motors designed to operate in severe environments including cryogenic environments, environments subject to high levels of interference, vacuum (space), and so on. To be more precise, the invention is not so much concerned with the service operation of such motors as with the preceding development and testing of stepper motors and their control devices which, in practice, are periodic signals.

2. Description of the Prior Art

In practice, to test a stepper motor under its future service operating conditions, the usual procedure is to test all of the mechanisms in which the stepper motor is to be integrated. The combination of the resulting overall dimensions of the device under the test and the constraints associated with simulating the severe service operation environment means that in practice the motor is inaccessible for installing measurement sensors to monitor the operation of the motor and the torque that it produces.

It, therefore, appears essential, if stepper motors are to be tested accurately, to test them in isolation, independently of the mechanisms into which they are designed to be integrated; however, tests of this kind presuppose the possibility of simulating as accurately as possible the actual conditions under which power is supplied to the stepper motors in service, assuming this is known. Stepper motor control simulation systems currently available on the industrial market can simulate only a small number of typical, conventional power supply regimes which are in practice far removed from real power supply regimes, especially in a severe environment. Various known electronic circuit boards and systems are adapted to generate conventional pulse, squarewave, sine/cosine control signals. A solution offering slightly better performance is put forward in the document FR-2 440 642. In the case of a motor with four windings, this document teaches the digital application to the windings, to one winding or to two windings simultaneously, of currents between a zero level and a maximum level, for example at levels representing one third and two thirds of maximum level. However, given the necessarily limited number of such intermediate levels, the disclosure of this document enables only highly approximate simulation of a real curve composed of a multitude of intermediate levels between its extreme levels.

The need to be able to accurately simulate the power supply regime and the operation of a stepper motor is particularly crucial in the case of space applications. Stepper motors are being used more and more frequently on satellites where they are called upon to operate in very severe environmental conditions, in particular in a vacuum. In some cases stepper motors are even used in a cryogenic environment, especially as drive motors in infrared observation systems. Cryogenics is the technology of low temperatures, meaning temperatures below $-173°$ C. approximately, at which the major gases (hydrogen, nitrogen, oxygen and air) are in the liquid state. The range of temperatures approaching absolute zero (0 K.) that is to say temperatures of around 0 K. to 4 K., are particularly important.

It is obvious that simulating at ambient temperature the behavior of a stepper motor at cryogenic temperatures involves eliminating all temperature effects. It is, therefore, necessary to simulate the power supply regime of a stepper motor for a cryogenic application in terms of current rather than in terms of voltage. The previously mentioned document FR-2 440 642 provides a partial response to this requirement.

The somewhat rudimentary nature of the devices currently known for generating stepper motor control signals, in other words the devices determining the stepper motor's power supply regime, explains the empirical approach adopted until now in developing mechanisms designed to integrate a stepper motor. Based on a relatively crude evaluation of the torque required, a choice is made from the conventional type signals (pulse, squarewave, sine/cosine, etc.) of the signal type which seems most appropriate to obtaining the required torque. The power rating of the stepper motor to provide the required torque given the selected simplified power supply regime is then determined, including a margin to allow for the imprecise knowledge of how the stepper motor will actually behave in subsequent service.

SUMMARY OF THE INVENTION

An object of the invention is to alleviate the aforementioned drawbacks by proposing a stepper motor development and test device, referred to as a universal adaptive control bench, enabling current control of stepper motors and providing, in addition to the conventional control signals (pulse, squarewave or sine/cosine), the facility to apply any specific control signal. The stepper motors developed or tested can be of any type, two-phase or four-phase, as currently available on the industrial market, or specific products to be developed in the future for a specific application.

To this end, the invention proposes a control law simulator device for a stepper motor with N windings, which has a digital signal generator stage including a computation unit composed of a central unit to which are connected an input/output peripheral device module for use by a user, a memory module and a clock module of frequency f. A plurality of at least N identical triggerable memory units connected in parallel to the computation unit are controlled by the clock module and each drive an identical digital-to-analogue converter. The memory units are adapted to contain cyclic sequences of m signal values of period n, substantially identical from one memory unit to another except for an offset of n/4 representing one step.

The control simulator device also has an analogue power stage constituted by a plurality of N identical voltage-current converters each connected to the output of a digital-to-analogue converter and adapted to have its output connected to one winding of the stepper motor, to apply thereto a signal of frequency f/n.

Thus, it is a primary object of the invention to generate control signals by means of a computer with an associated electronic interface. These signals are directly reproduced at the windings of the stepper motor (current control) and can be of any type, provided that the motor can withstand their maximum amplitude. The invention makes it possible not only to reproduce stepper motor control laws, allowing for the fact that the motors may be subjected to severe environmental conditions, but also to determine the laws, for example from data on the required torque variation; for example, it may be necessary to prevent sudden variation in the output torque to avoid excessive mechanical loads on mechanical parts (gears driven by the motor, for example). This facility to determine control laws results in particular from the facility provided by the invention to generate control laws with any profile; it thus becomes possible by means of successive tests to define the (possibly complex) profile of a control law enabling a torque to be generated with no sudden variations, for example.

It should be noted that the invention provides for controlling stepper motors not only in actual steps but also submultiple steps to full steps as well as submultiple steps or microsteps.

One advantage of the invention is the facility to program for the start or the end of a test a first and/or last steps of different amplitude and/or duration from the other steps, specifically steps one period away from the first and/or last step. In this way it is possible to avoid the occurrence of transient conditions at the start and/or the end of the test. This result can be achieved by software, by storing in triggerable memory units the points of the curve required for the first or last step and the points of the "normal" curve required for the other steps.

The use of a different first step is highly advantageous as it circumvents a large number of problems, including oscillation of the motor shaft.

Tests carried out as part of the ISOCAM program have shown the benefit of optimizing the control law and the operating regime of the electromechanical system. Experience has shown that this control law is difficult to model and that its determination by simulation with actual components is highly beneficial. The same approach may be adopted in respect of the final steps.

It will be understood that the invention makes it possible to determine or at least to reproduce in the laboratory the power supply regime of a stepper motor irrespective of the application and irrespective of the waveform of the current applied in service to each winding, however complex this may be. Nevertheless, the invention achieves this result in a way that is simple, fast, reliable and relatively inexpensive.

According to a particularly advantageous feature of the invention that is innovative in its own right, the digital signal generator stage has four triggerable memory units and four digital-to-analogue converters, first and second analogue power stages, respectively including four and two voltage-current converters, and a switching circuit adapted to selectively connect the four digital-to-analogue converters to the four voltage-current converters of the first analogue power stage or two predetermined digital-to-analogue converters to the two voltage-current converters of the second analogue power stage.

A device of this kind can be used to test two-winding and four-winding stepper motors. Preferred features of the invention, some of which can be combined, are as follows.

Each digital-to-analogue converter and the associated triggerable memory unit are carried by a common circuit board and the plurality of voltage/current converters of the analogue power stage are carried by a common circuit board. The clock module frequency f is programmable, the period n of the cyclic sequences of values stored in the plurality of triggerable memory units has a value of at least 100, and the period n has a value of at least 1,000.

When the analogue power stage is adapted to be connected to a two-phase motor, each voltage-current converter includes an operational amplifier. The non-inverting input of the operational amplifier receives a voltage signal, the output is connected to the positive terminal of the associated winding and the inverting input is connected to the negative terminal of the winding and additionally grounded by a resistor.

When the analogue power stage is adapted to be connected to a four-phase motor, each voltage-current converter includes an operational amplifier, the non-inverting input of which receives a voltage signal, the output of which is connected to the gate of an MOS transistor whose source is connected to the winding in question, and the inverting input of which is connected to the drain of the MOS transistor and additionally grounded by a resistor.

Objects, characteristics and advantages of the invention will emerge from the following description given by way of non-limiting example with reference to the drawings appended hereto.

DETAILED DESCRIPTION OF THE PREFERRED EMBODIMENT

Figure 1A:
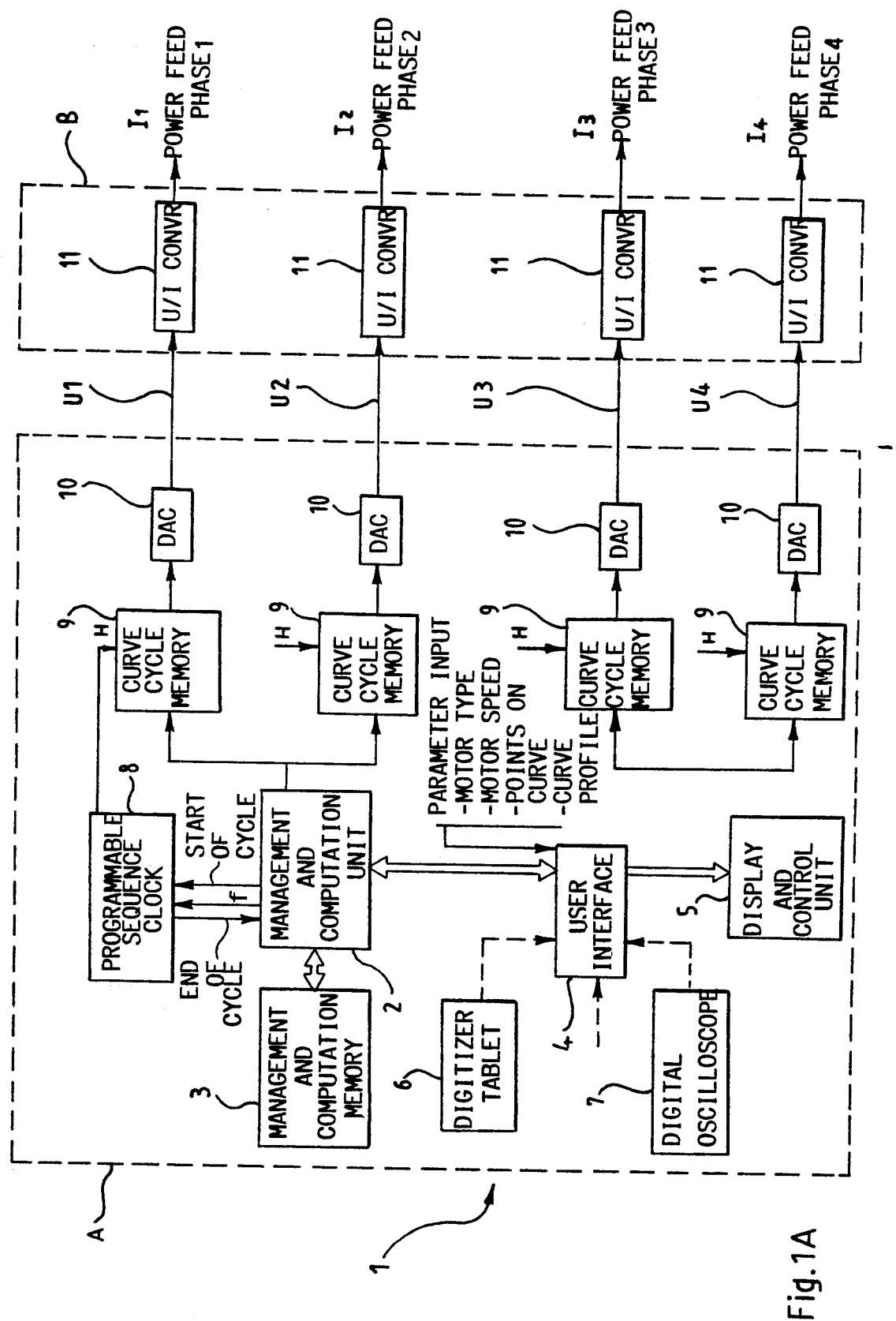
FIG. 1A is a block diagram of a stepper motor control simulator device in accordance with the invention for a motor with four windings.

FIG. 1A shows the general structure of a control simulator bench or device 1 constituted by a digital signal generator stage A and an analogue power or driver stage B.

The digital signal generator stage A is not in fact entirely digital as its output signal is an analogue signal, but the term "digital" is used to distinguish the signal generation process from the analogue process applied in the analogue power or device stage B.

The digital signal generator stage A includes a management and computation unit 2 with its own management and computation memory 3. The management and computation unit 2 is connected to at least one user interface module 4 (input-output peripheral device module). In practice, this module includes a keyboard and a display and control unit 5, for example, a visual display screen. The user employs this module to enter various parameters governing the conduct of a test, including the main specifications of the motor under test, the target motor speed, the number of points defining the curve to be reproduced, the values at these points, and so on. Various dedicated interfaces may also be provided, in particular for input of the points constituting the curve to be reproduced: these include a digitizer tablet 6 and a digital oscilloscope 7 storing the curve in its memory, for example.

The digital signal generator stage A further includes a clock module 8 adapted to generate a clock signal H at a frequency f which is advantageously programmable, on the basis of the chosen parameters, during a number of cycles (number of periods of the curve to be reproduced) that can also be programmed. Of course, the frequency f of the clock signal is very much higher than the cycle frequency, for example, by a factor of at least 100 or even 1000, depending on the accuracy with which the profile of the control curve to be applied to the motor must be defined.

The clock module is adapted to be activated by a start instruction from the management and computation unit 2 and to send to the latter an end of test cycle signal; it also receives from the unit 2 a signal determining the programmable frequency.

Figure 1B:
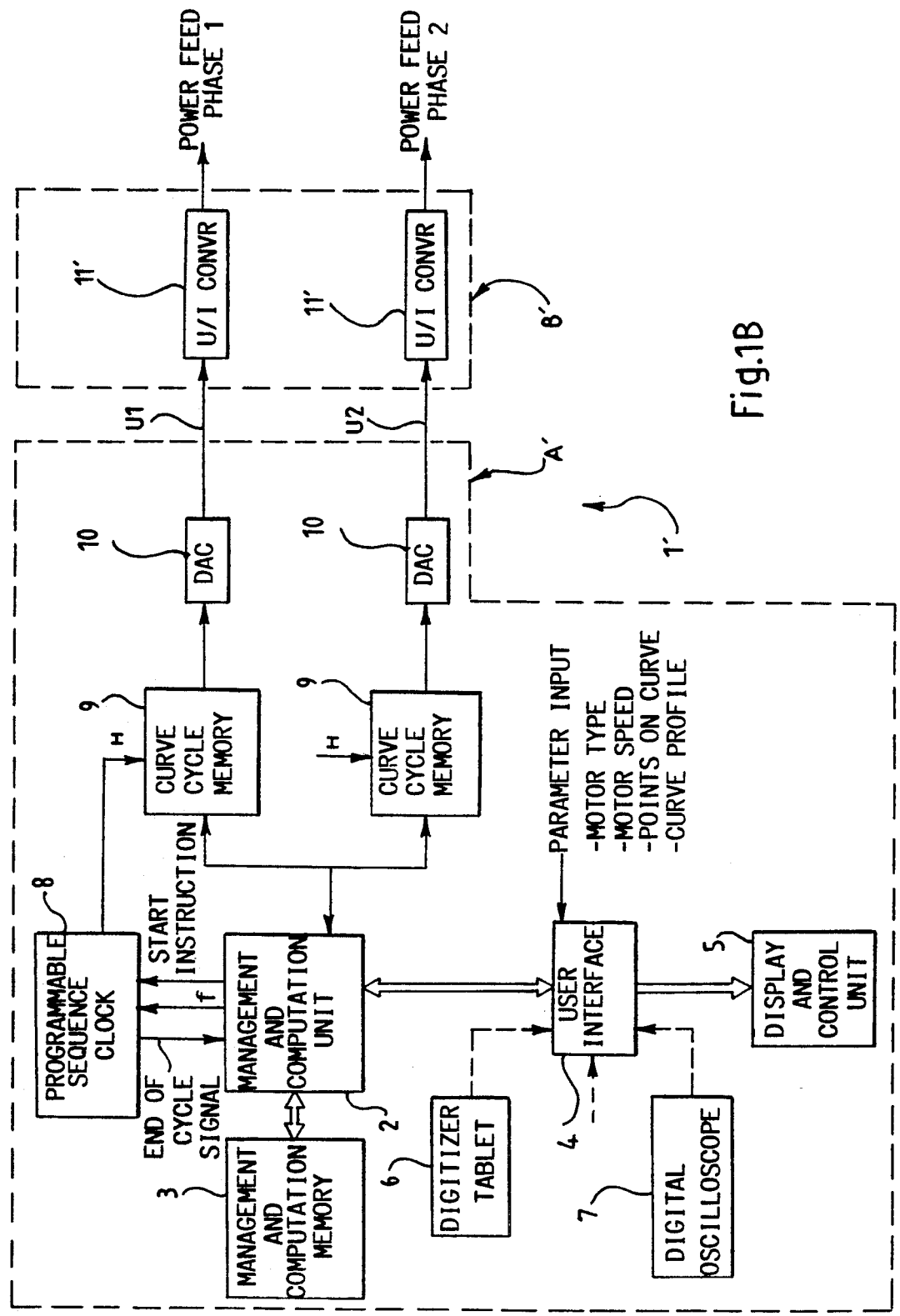
FIG. 1B is a block diagram of another simulator device for a stepper motor with two windings.

To the management and computation unit there are further connected in parallel identical triggerable memory units 9, the activation or control signal of which is the clock signal H. There are as many units 9 as there are phases or windings to be controlled in the stepper motor in question. There are four such units in this implementation, for a stepper motor with four phases which are denoted M4 hereinafter. FIG. 1B shows an alternative implementation the A' of digital generator type with two units 9 for a stepper motor with two phases which are denoted M2 hereinafter.

The units contain the successive values at points on the curve to be generated for each phase and they output at the clock signal frequency f a digital signal which takes these values successively. These point values have a frequency n and their number m, which is greater than or equal to n, can, as required, represent an integer number or a non-integer number of cycles each of n values.

On the output side of each unit 9 is a digital-to-analogue converter (DAC) 10 at the output of which appears a voltage U ($U_1$ for phase 1, $U_2$ for phase 2, and so on) which approximates the curve to be obtained, according to a profile set arbitrarily by choosing values stored in the triggerable memory units 9 entered either via the keyboard or by either of the units 6 and 7, in particular by sampling.

Each triggerable memory unit 9 and the associated DAC constitute an arbitrary signal generator module.

Although the curves stored in each of the units 9 are different at a given time they are deduced from each other by applying a phase-shift of one electrical step, so that it is sufficient to enter one of these curves and then to have the management and computation unit 2 deduce the others, which will be described in more detail later.

The analogue power or driver stage B or B' essentially constitutes, on the output side of each arbitrary signal generator, a voltage/current converter 11 or 11' adapted to produce an output current I ($I_1$, $I_2$, etc for the various phases) proportional to the voltage $U_1$, $U_2$, etc. and having a maximum amplitude compatible with the motor in question, so that this current can be applied directly to the winding in question.

There are four converters 11 or 11' for a four-phase motor or two converters 11 or 11' for a two-phase motor.

Figure 1C:
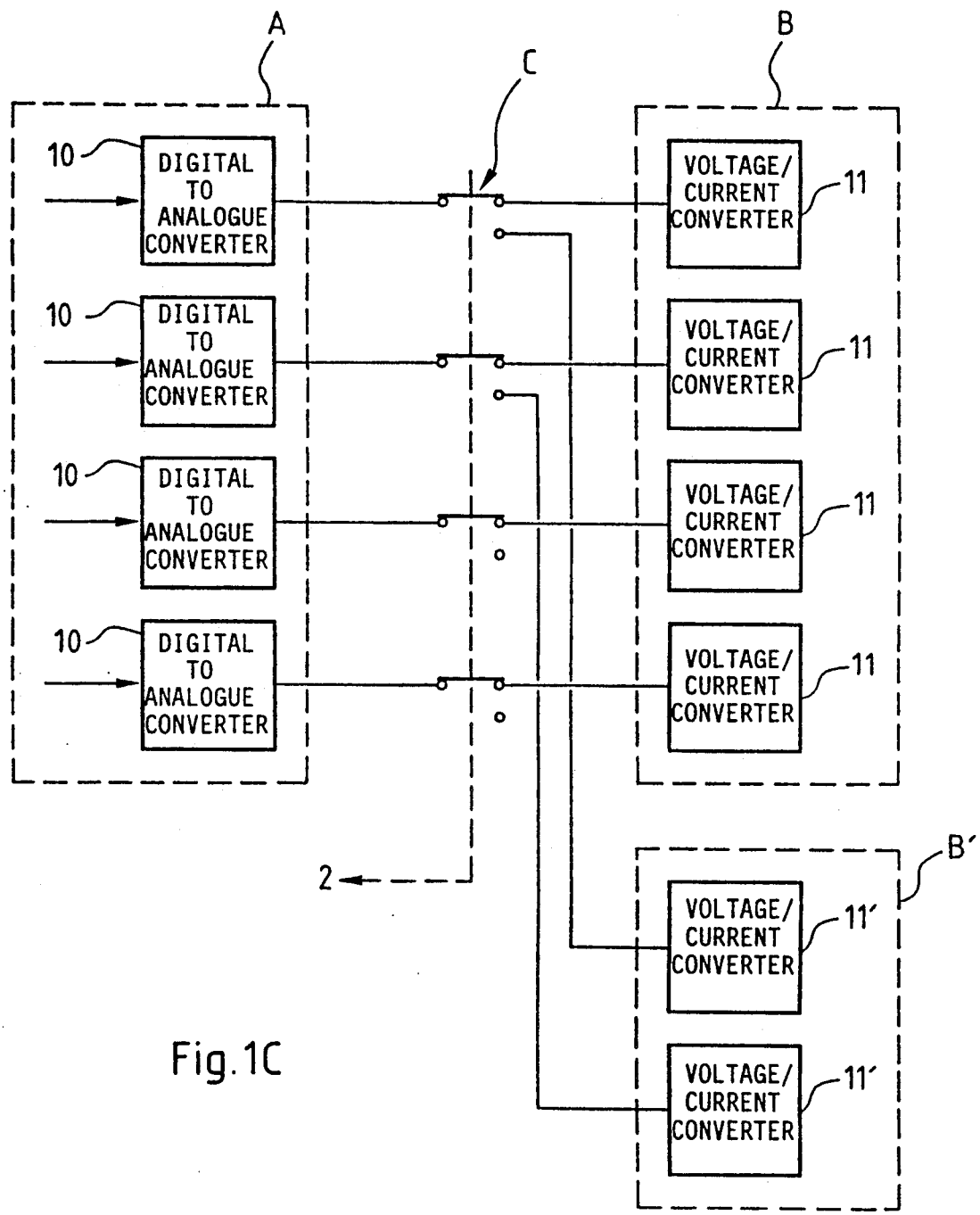
FIG. 1C is a simplified block diagram of another stepper motor control simulator device for motors with two or four windings.

FIG. 1C shows a universal bench that can be used to test and design, at will, a two-phase motor or a four-phase motor.

This bench has the digital signal generator stage A from FIG. 1A and each of the analogue power or driver stages B and B' from FIGS. 1A and 1B.

A switching circuit C controlled by the computation unit 2 or operated by hand connects either a predetermined two DAC to the analogue power or driver stage B' or all four DAC 10 to stage B.

Figure 2A:
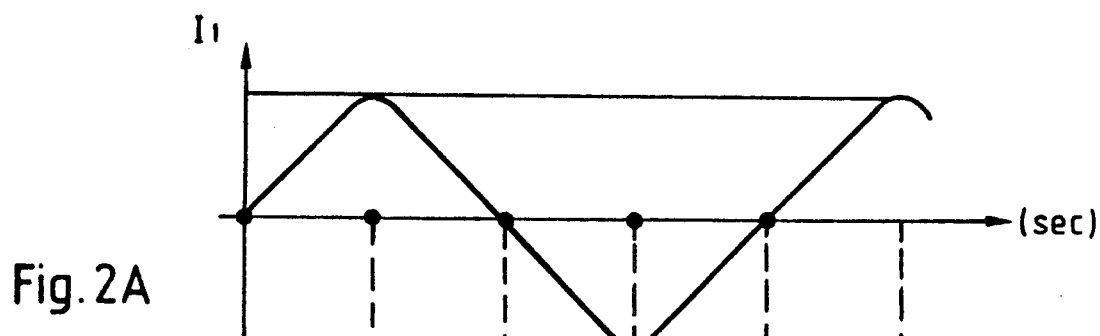
FIGS. 2A and 2B are graphs showing the current in two windings of a stepper motor as a function of time in a simple case.
Figure 2B:
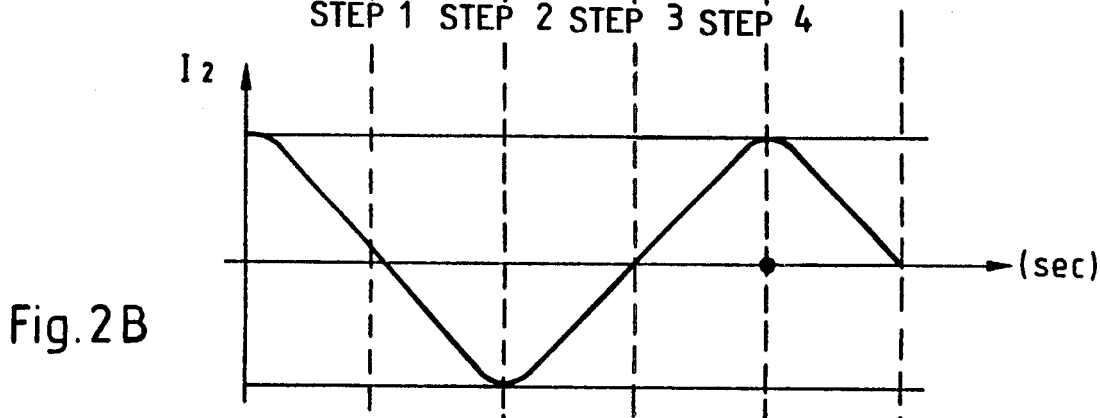

FIGS. 2A and 2B show, in the very simple case of a sine/cosine control signal, the relationship between the currents $I_1$ and $I_2$ in the windings of a two-phase stepper motor: they are identical but offset by one step, with each period or cycle having four equal steps.

Figure 3B:
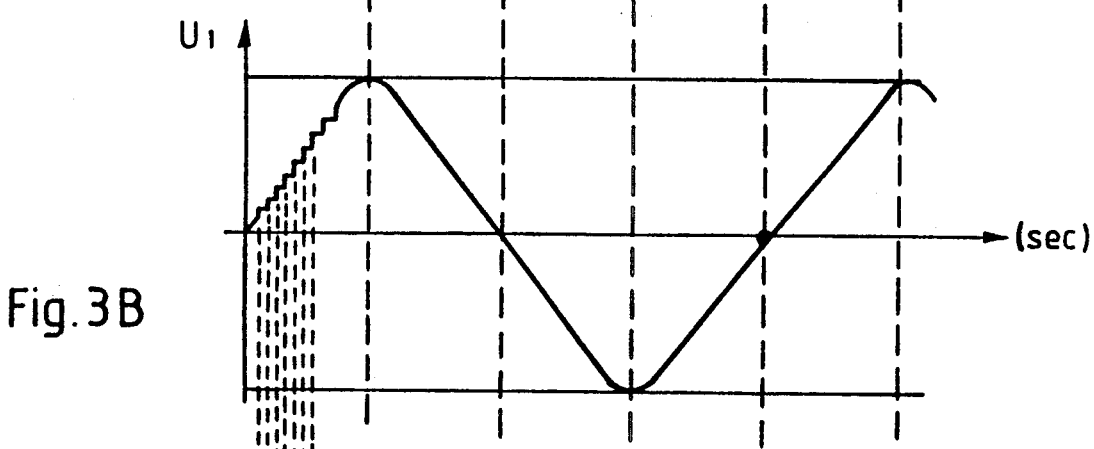
FIGS. 3A and 3B, respectively, show the clock signal H and the voltage signal $U_1$ generated by a digital-to-analogue converter in the same simple case.
Figure 3A:
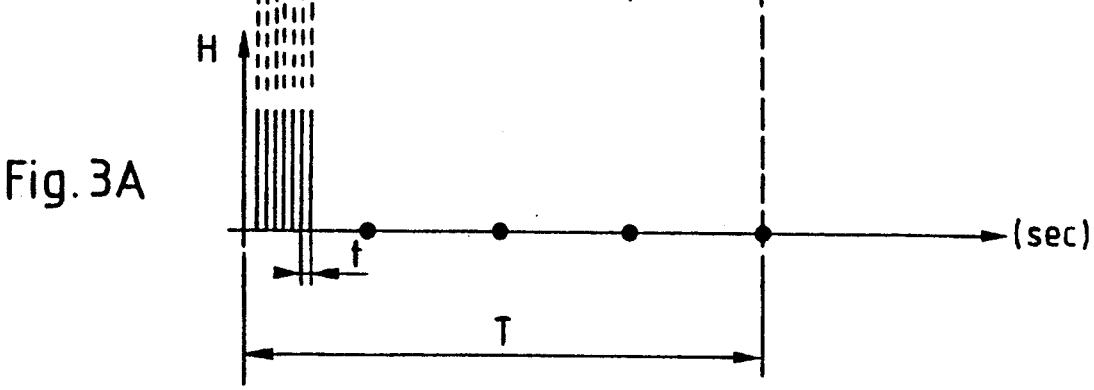

FIG. 3A shows the clock signal H; on each pulse of this signal the signal $U_1$ takes the value of the next point on the curve stored in the triggerable memory unit. As the period t of the signal is much smaller than the period T of the signal $U_1$, $U_1$ appears to be continuous even though it is generated discontinuously.

It will be understood that by interrupting the clock signal at an appropriate time it is possible to "fix" the stepper motor at any point on the winding power supply curve.

Figure 4:
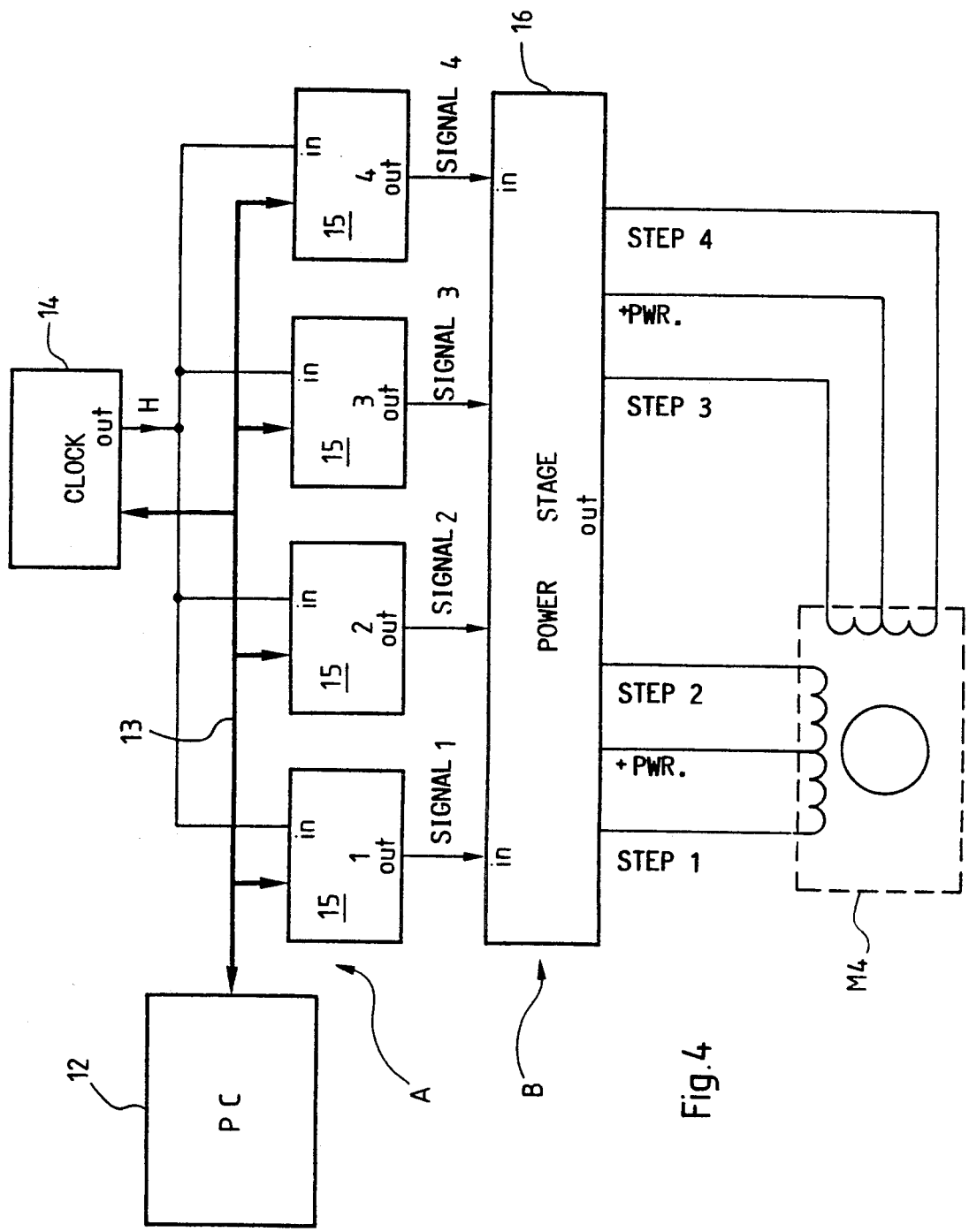
FIG. 4 is a block diagram of one implementation of the device of FIG. 1A for a stepper motor with four phases.
Figure 5:
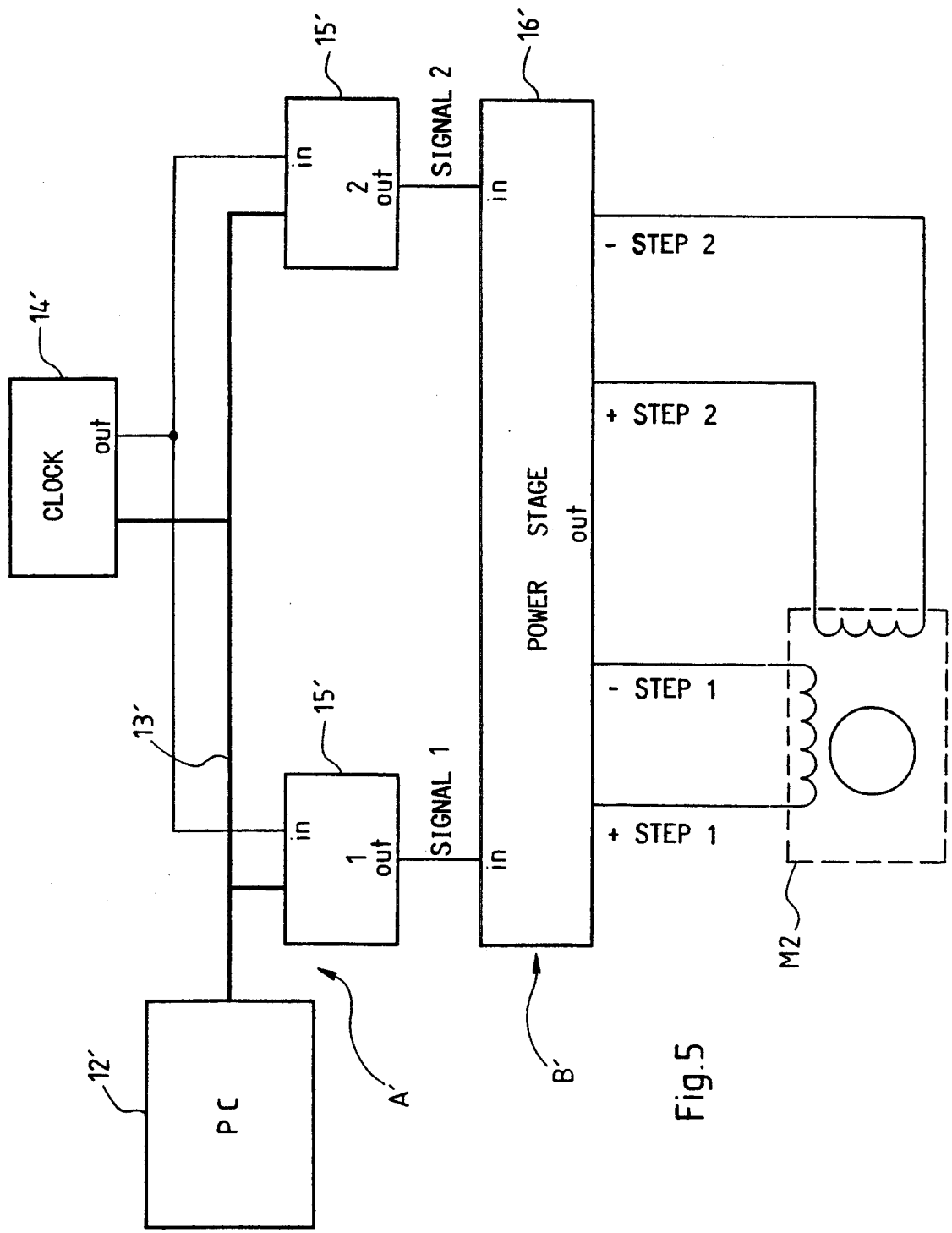
FIG. 5 is a similar diagram for a stepper motor with two phases.

FIGS. 4 and 5 show two implementations of the devices from FIGS. 1A and 1B.

In each case, the units 2 through 5 are embodied in a microcomputer (PC) 12 (the FIG. 5 units are identified by the same reference numbers "primed").

A connecting bus 13 (13') links a clock board 14 (14') representing the clock module unit 8 (8') and four (or two) arbitrary signal generator boards 15 (15') each carrying one triggerable memory unit 9 and its associated DAC 10 (the boards 15 and 15' are identical). To the output side of the boards 15 (15') is connected a power and converter board 16 (16'), to be described in more detail later, the outputs of which are connected to the windings of the motor concerned (M4 or M2).

Figure 6:
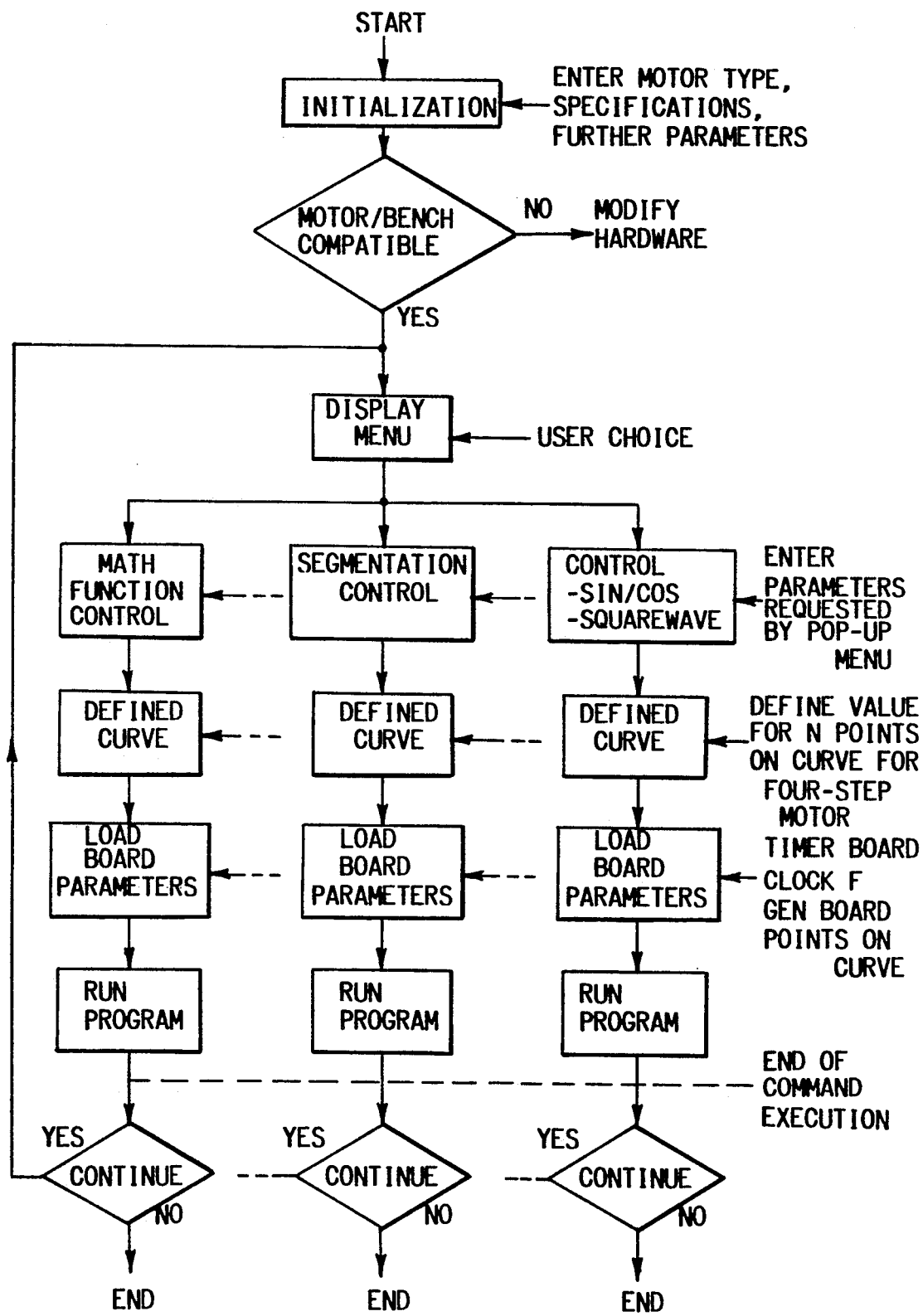
FIG. 6 is a basic flow chart of the software associated with the device of FIG. 1C.

The computer 12 (12') executes appropriate software to control all these circuit boards. FIG. 6 is a self-explanatory simplified flow chart of this software.

To summarize, an initialization phase specifies the motor type and its specifications and any further parameters. The software then checks that the bench and the characteristics of the motor under test are compatible; if not, the components of the bench 1 must be modified. In the example given, a number of options are provided so that the control curve can be defined by basic mathematical functions (exponential, logarithmic, sine/cosine, etc) or combinations of such functions (see left-hand column), by segmentation (this is the case mentioned above for any profiles, see the center column) or in terms of simple geometrical profiles (pulse, squarewave or sine/cosine). When this option has been chosen, the necessary parameters are entered in turn to define the required curve completely (number of points, number of cycles, clock frequency, etc).

The program is then executed to generate the current applied to each winding. There is then a choice between a further test or stopping the test.

The operation of the bench will now be described.

The clock board 14 (14') supplies the clock signal in which the number of cycles is programmed for the specific application. The number of cycles defines a specific number of motor steps.

The clock signal is routed to each of the arbitrary signal generator boards 15 (15') which are then used in "external clock" (slave) mode to synchronize the output signals. This produces an analogue signal timed by the clock signal supplied by the clock board.

The functional parameters of the boards 15 (15') are software programmable: number of points per cycle and amplitude for each point, which can vary between the maximum positive and negative output voltages of the board.

Note that one cycle of the signal programmed on an arbitrary signal generator board represents a control signal covering four motor steps for one phase.

In this way, by appropriate choice of the various parameters of the clock and arbitrary signal generator boards, the stepper motor can be controlled with any type of signal, to suit the requirements of the user.

Interrupting the clock signal "freezes" the arbitrary signal generator board output signal at its last value and so stops the stepper motor.

Figure 7:
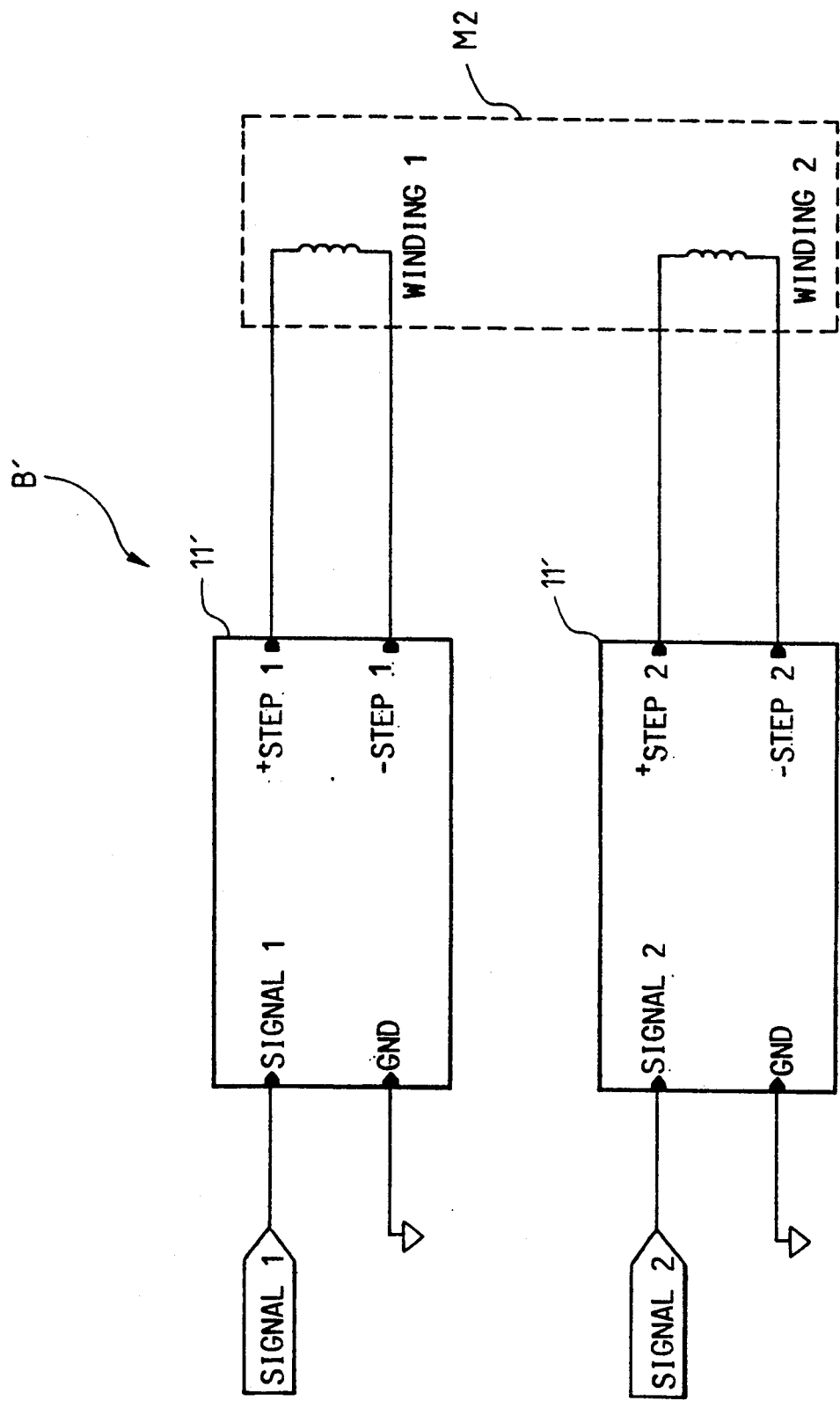
FIG. 7 is a block diagram of a power stage for a stepper motor with two phases.
Figure 8:
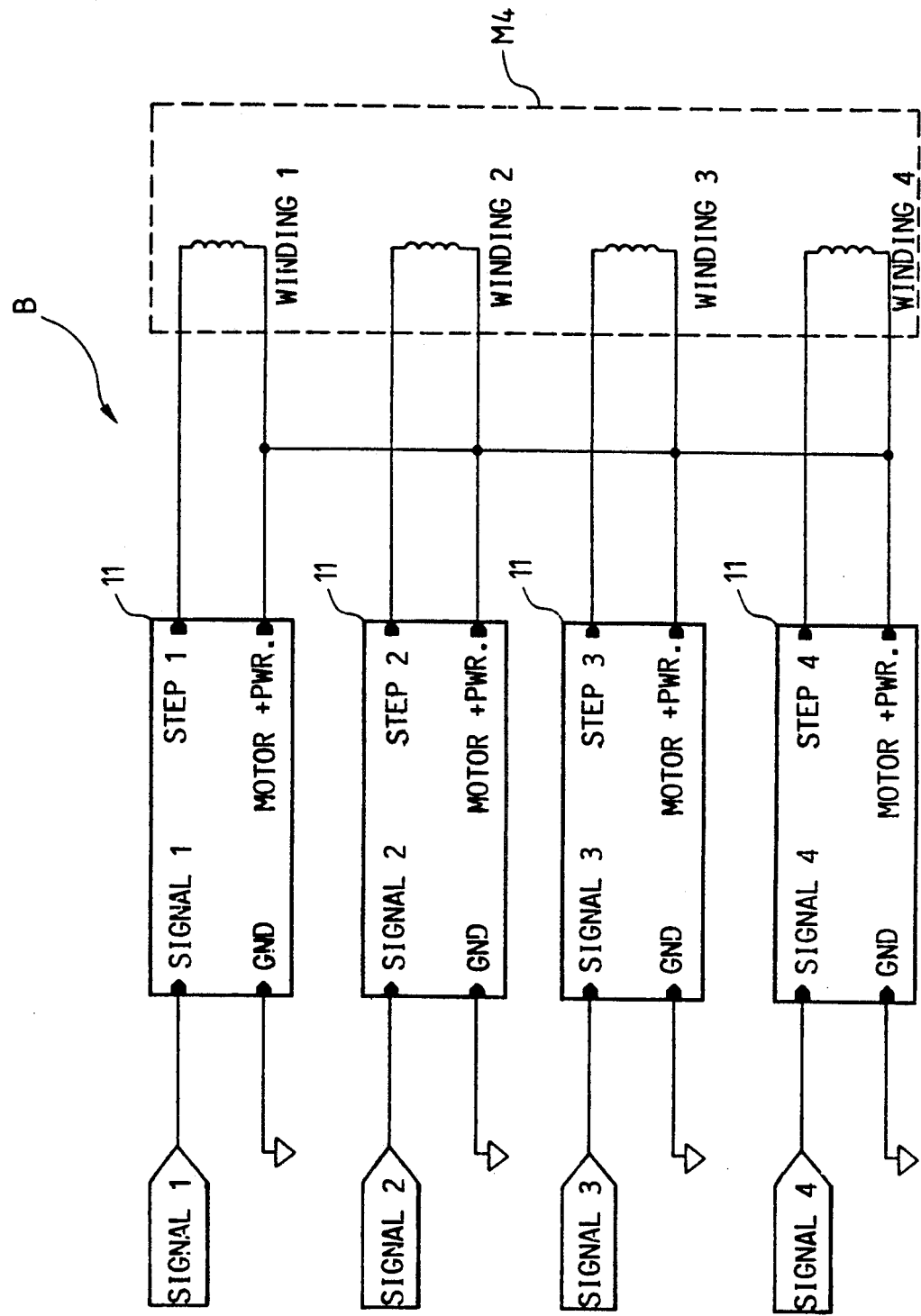
FIG. 8 is an analogous diagram for a stepper motor with four phases.

As already mentioned, the power or driver electronic interface B (B') is essentially a voltage/current converter. The analogue signals from the boards 15 (15') are converted into current signals proportional to the analogue signals. The respective converter for each of the two motor configurations is modelled by the four-pole network from FIGS. 7 or 8 with one input grounded.

One possible implementation of these voltage/current converters will be described below, but any other circuit may be used.

Figure 9:
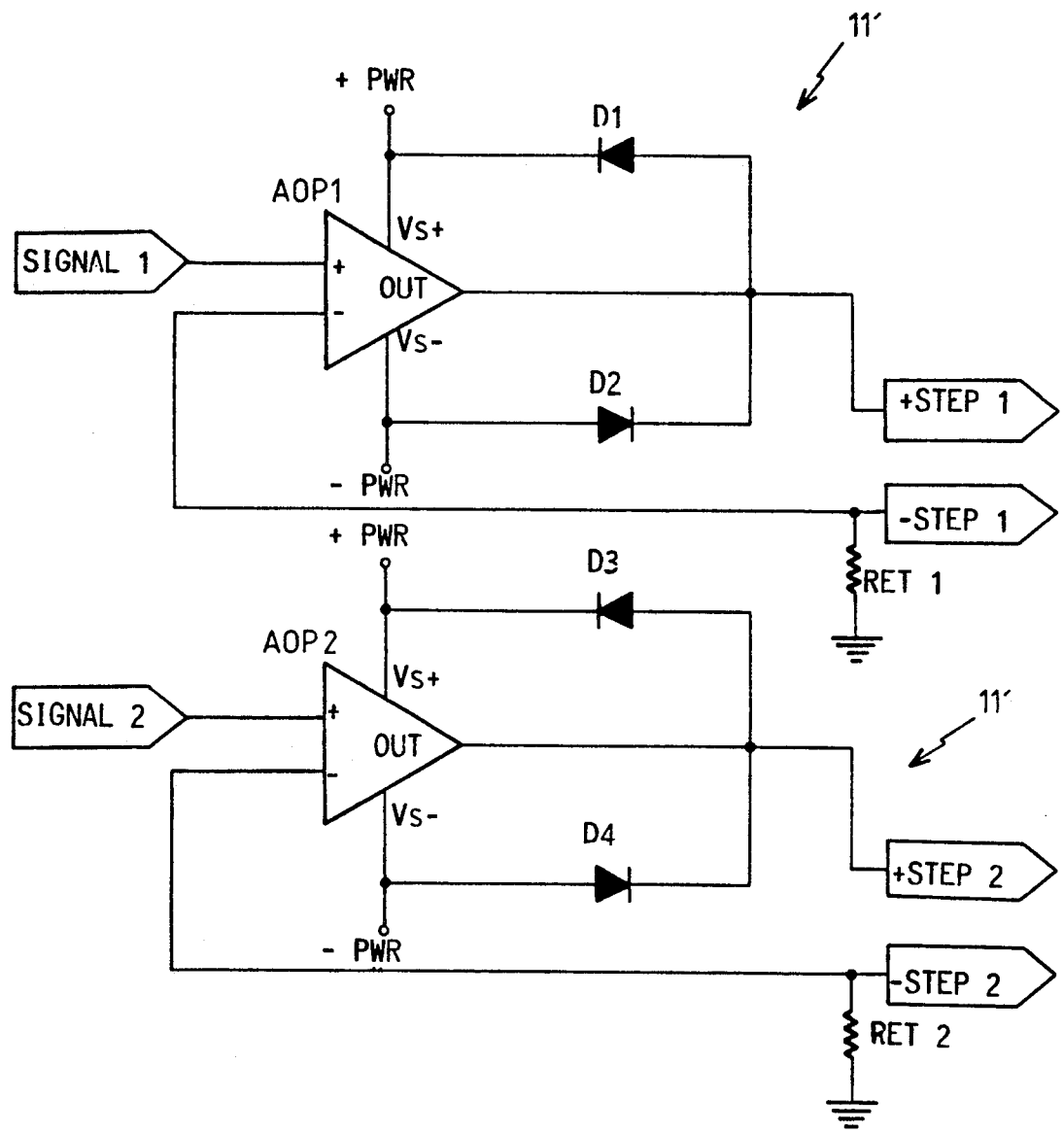
FIG. 9 is a simplified electronic circuit diagram of the power stage of FIG. 7.

FIG. 9 shows the circuit for the motor M2.

The operation of the circuit will be described with reference to the first motor winding. The operation with reference to the second winding can be deduced therefrom by analogy.

The voltage/current converter 11' is a conventional circuit based on a power operational amplifier AOP and a resistor Ret grounding the negative terminal of the winding.

Assuming an ideal operational amplifier, the transfer function of a circuit of this kind can be reduced to the expression:

$$I = V_{signal\ 1}/Ret$$

This produces a motor winding control current I which is directly proportional to the control voltage "$V_{signal\ 1}$". A value can be chosen for Ret knowing that the value of $V_{signal\ 1}$ can vary only between $+V_{max}$ and $-V_{max}$ and that the maximum rated current of the motor winding must not be exceeded.

This circuit avoids a good number of problems associated with voltage control, such as the current set-up time in the winding, the necessity to use self-oscillatory circuits and the need for numerous and difficult to define protective features.

The diodes D1 and D2 (D3 and D4) protect the circuit against voltage spikes due to the inductance of the motor.

If $V_{signal\ 1}$ is programmed to reproduce a motor rotation cycle reproducing a signal already observed at the motor winding during an experiment, it is possible to reproduce in the laboratory the behavior of the motor under the critical conditions of the experiment.

Also, as the torque is proportional to the current, it is sufficient to determine the required torque curve to be able to reproduce it at the motor windings.

The value of the resistor Ret depends on the type of stepper motor selected, and, therefore, on the maximum current allowed in each winding. For a general-purpose control law generator the value of Ret may be made programmable by the user. Two essential parameters of the resistor Ret must be taken into account:

its maximum power rating ($<Ret.I^2max$), its accuracy, to minimize the error in respect of the value of I (1% accuracy is acceptable).

An ideal operational amplifier has been assumed. This is acceptable given the performance of modern operational amplifiers and the required accuracy in respect of the value of I.

The operation of the circuit in the case of a four-phase motor will now be described with reference to FIG. 10 and with reference to the first motor winding: the operation with reference to the other windings can be deduced therefrom by analogy.

The voltage/current converter 11 is derived from the previous circuit, based on operational amplifiers AOP1', AOP2'. In this implementation the operational amplifier is not used as a power component but merely to turn on a power MOS transistor Q1 (Q2) requiring only a very low gate current.

Given the mode of operation of a four-phase stepper motor, the center-tap of windings 1 and 2 (3 and 4) is held at a positive potential (MOTOR+PWR) at all times.

When the MOS transistor is turned on, and assuming an ideal operational amplifier, the transfer function of the circuit can be reduced to the equation:

$$I = V_{signal\ 1}/Ret$$

An MOS transistor has a low drain-source resistance (RDS (ON)) and so can carry a high current (within limits set by the component specifications) with only low thermal losses.

As already explained, by appropriately programming the waveform of the signal $V_{signal\ 1}$, the required control signal can be generated at the motor winding. Generalizing this statement to cover the four signals produced by the arbitrary signal generator boards, it is possible to reproduce all required types of motor operation.

To give an example, the requirement for this control bench having originated in connection with space applications, the implementation is in a first stage applicable to two SAGEM space qualified stepper motors: 23PP bipolar control two-phase motor and 11PP unipolar control four-phase motor.

However, by carrying out a limited number of minor modifications to the electronic interface circuit boards, the bench can control any currently available stepper motor.

The computer 12 in FIG. 4 is an IBM PC AT or compatible microcomputer, for example. To its internal bus 13 (13') are connected a CONTEC TCG 10 clock board 14 (14') and four QUATECH WSB10 arbitrary signal generator boards 15 (15').

These boards are general-purpose boards and may be used for applications other than applications relating to stepper motor control. Other manufacturers offer comparable products meeting the requirements. Provided that the software is adapted to suit the boards used, other boards may be chosen, in particular if the application requires greater accuracy and, therefore, a greater number of sampling points and a higher resolution.

The output signal of the arbitrary signal generator boards can be programmed with an amplitude between +5.12 V with a resolution of 1.25 mV (12-bit envelope resolution). The curve to be generated can be defined by 2048 points, that is 512 points per motor step given that a cycle of the curve represents four motor steps.

All parameters including the frequency, duty cycle and resolution can be software programmable.

Figure 11:
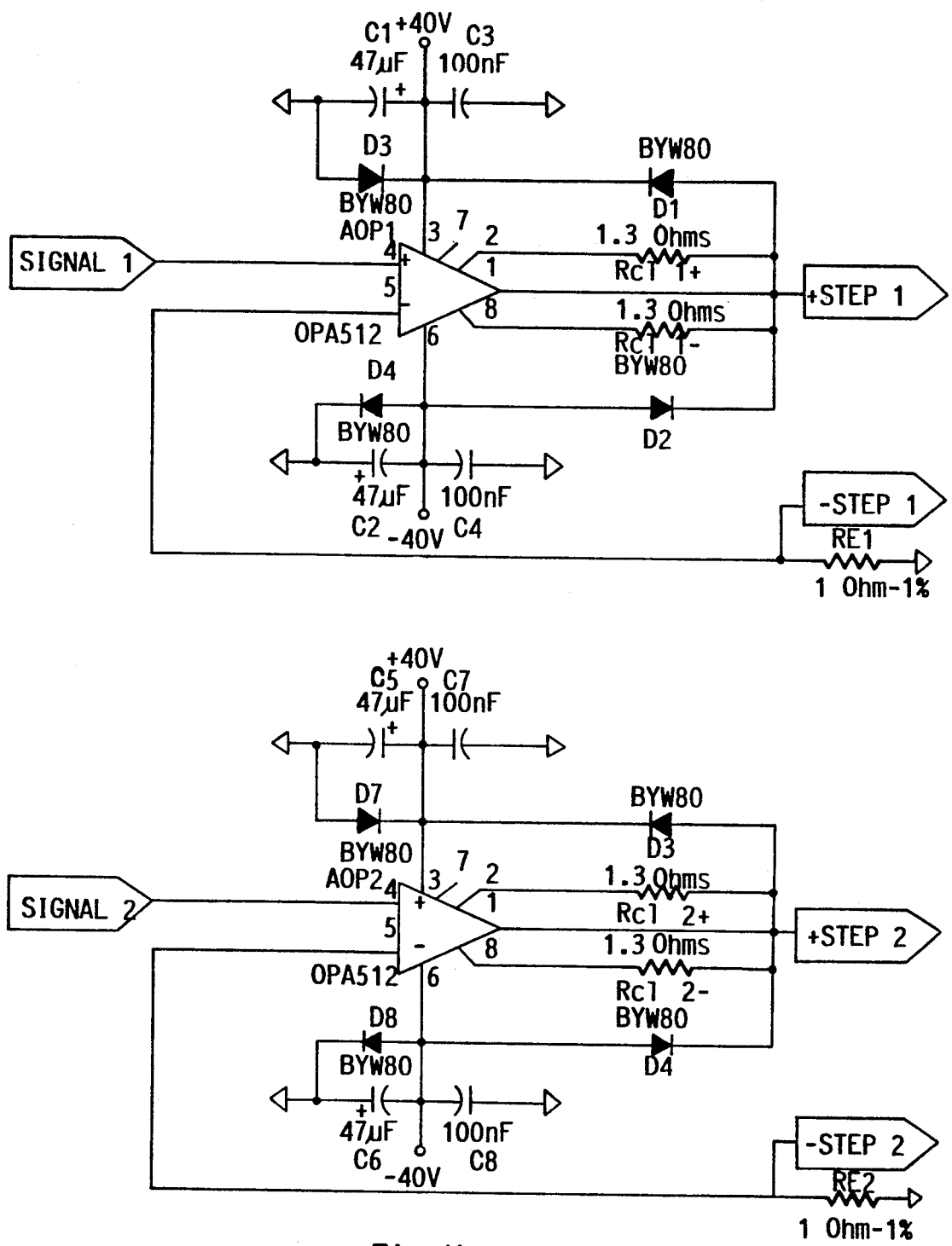
FIG. 11 is a detailed electronic circuit diagram of the power stage of FIG. 7.

The electronic circuit board circuit diagram in FIG. 11 is an implementation of the general structure shown in FIG. 9. The operational amplifier is a BURR-BROWN OPA 512. The main specifications of the circuit are:

maximum output voltage ±50 V,
maximum output current 15 A, constituting a perfect match to most two-phase stepper motors.

The output current can be limited by the resistors Rc11 and Rc12; for this application Rc11=Rc12=1.3 ohms:

$$I_{limit}=0.65/(Rc1+0.007)\approx 0.5 A \quad (1)$$

In this circuit the power and output terminals are protected by the BYW80 high-speed diodes D1 through D8.

The resistor Ret is a 1% non-inductive (wound) power resistor with a resistance of 1 Ohm:

$$I_{Max}=V_{signal\ max}/Ret=5\ A$$

The operational amplifier output current has been deliberately limited to a low value (0.5 A) to avoid any possibility of accidental damage to the 23PP motor. To use the bench with another type two-phase motor all that is needed is to modify the value of the Rc1 resistors using equation (1).

Figure 10:
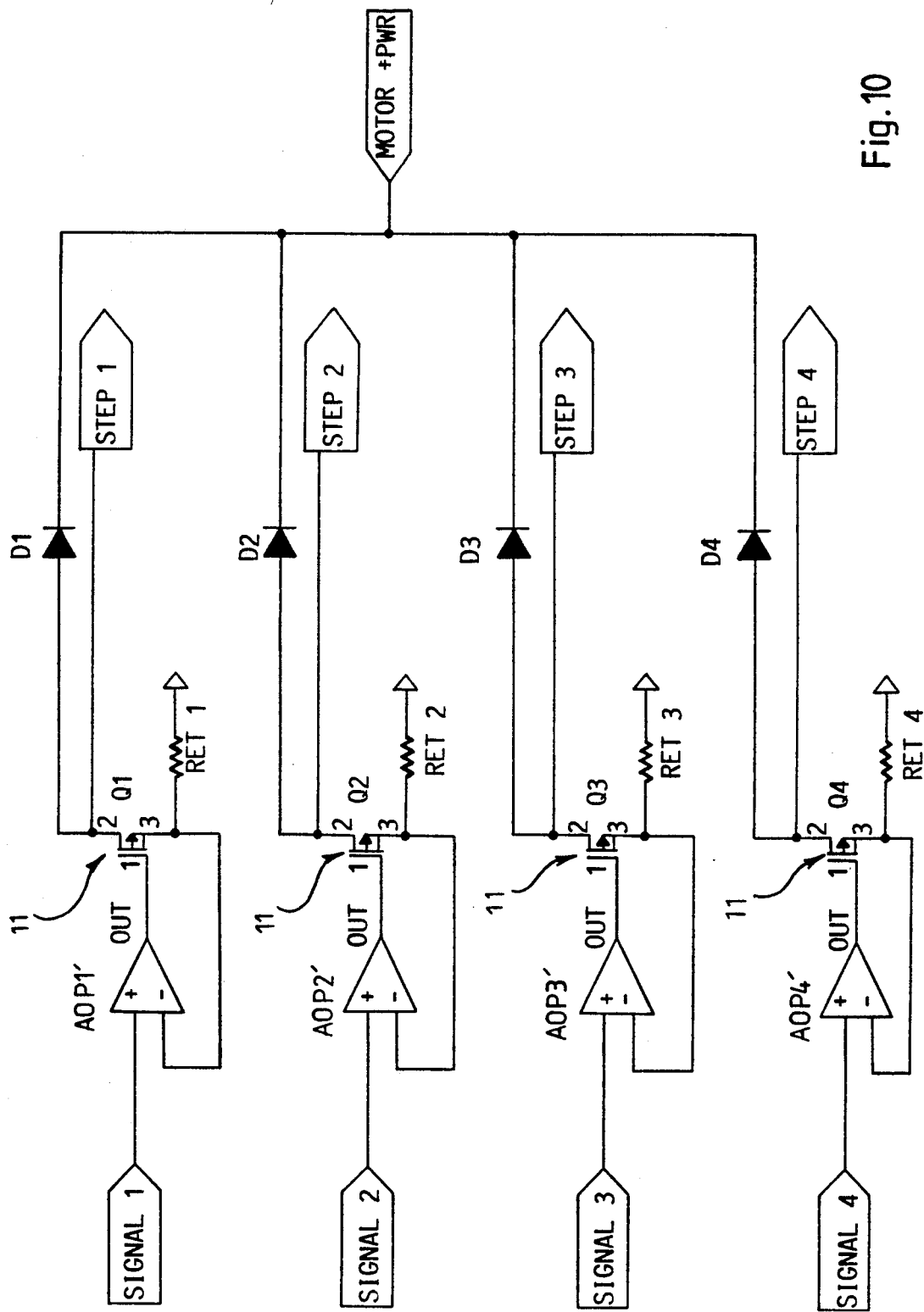
FIG. 10 is a similar electronic circuit diagram of the power stage of FIG. 8.
Figure 12:
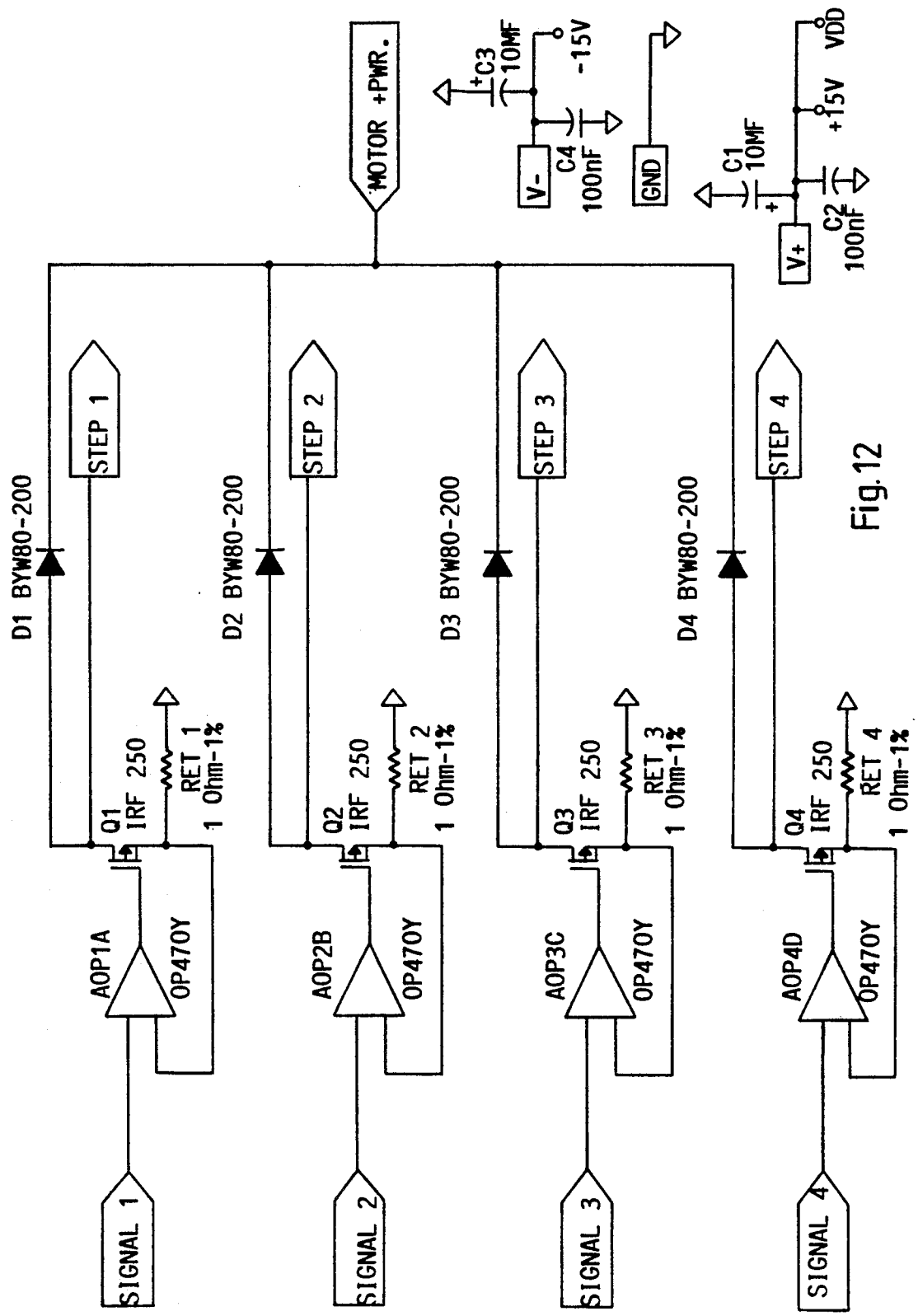
FIG. 12 is a detailed electronic circuit diagram of the power stage from FIG. 8.

The detailed circuit diagram of FIG. 12 for a four-phase motor is one implementation of the general structure shown in FIG. 10.

The operational amplifier is a PMI OP470 quad operational amplifier which has a supply voltage of ±15 V. The MOS transistor is an INTERNATIONAL RECTIFIER IRF 250 N-channel transistor.

The main specifications of this circuit are:
RDS (ON)=0.085 Ohm,
$ID_{max}$=30 A.

As the MOTOR=PWR voltage is external to the board and, therefore, can be set by the user, and given the high DRAIN current that the MOS transistor can carry, this circuit is suitable for most four-phase stepper motors.

Inductive loads can generate very high amplitude current spikes which can destroy the MOS transistor. The BYW80 protective diodes D1 through D4 are provided to absorb these spikes and so protect against breakdown of the transistor.

As in the previous example, the resistor Ret is a 1% non-inductive (wound) power resistor with a value of 1 Ohm:

$$I_{max}=V_{signal\ max}/Ret=5\ A$$

In the FIGS. 11 and 12 circuits filter capacitors are included as close as possible to the operational amplifiers.

The invention has been applied to laboratory simulation at ambient temperature of a SAGEM 11PP superconducting motor designed to operate at a temperature of 4° K. (−269° C.) in connection with testing the ISO-CAM camera (infrared observation in space).

The purpose of these tests was to determine the system margin, to plot a curve giving the torque as a function of the rotor position and to determine the optimum control law.

Figure 13:
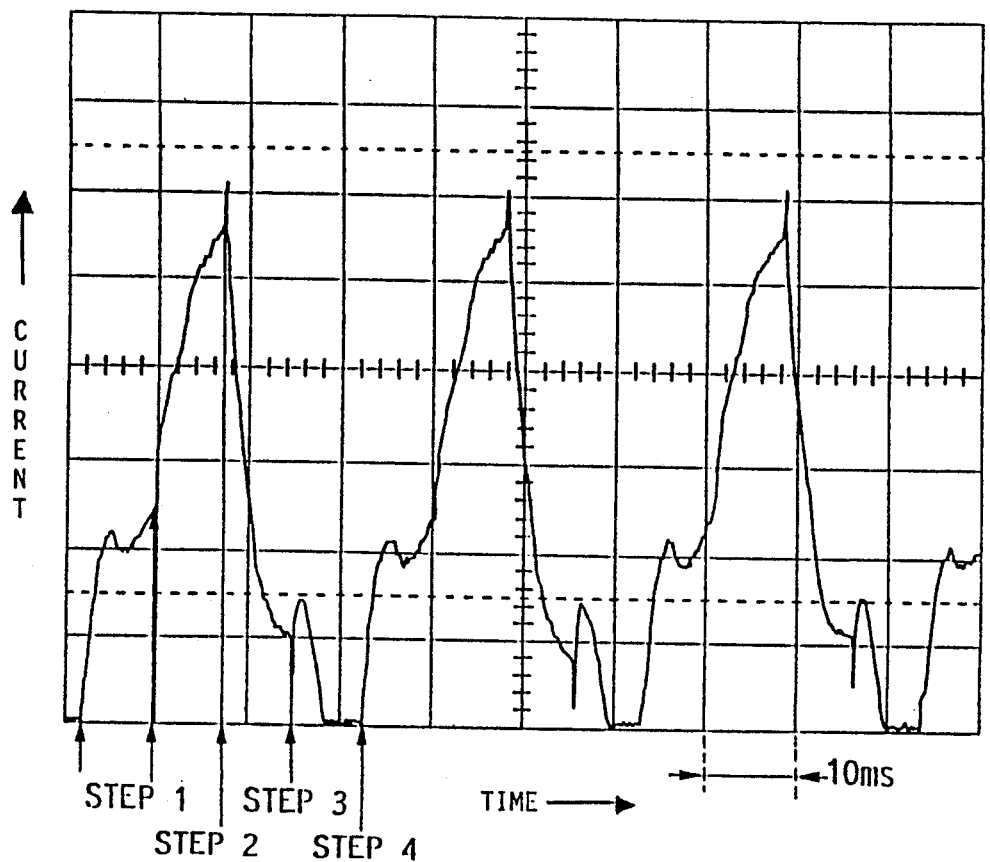
FIG. 13 shows a plot of the current in one phase of a four-phase motor at 4° K.

A current sensor and a digital oscilloscope were used to plot the current in the motor windings. It is sufficient to plot the current in one phase given that the current in the other phases is strictly identical to this with respective electrical phase-differences of 90°, 180° and 270°. FIG. 13 shows the curve as plotted, showing the motor steps.

On the basis of this curve, the signal is reconstituted over four steps by 2000 points stored in each of the four arbitrary signal generator boards 15. These boards are synchronized by the clock board 14. The motor speed depends on the programmed clock frequency. The motor is ready to operate in the laboratory at ambient temperature using the current control law of a motor assumed to be exposed to a temperature of 4 K.

Figure 14:
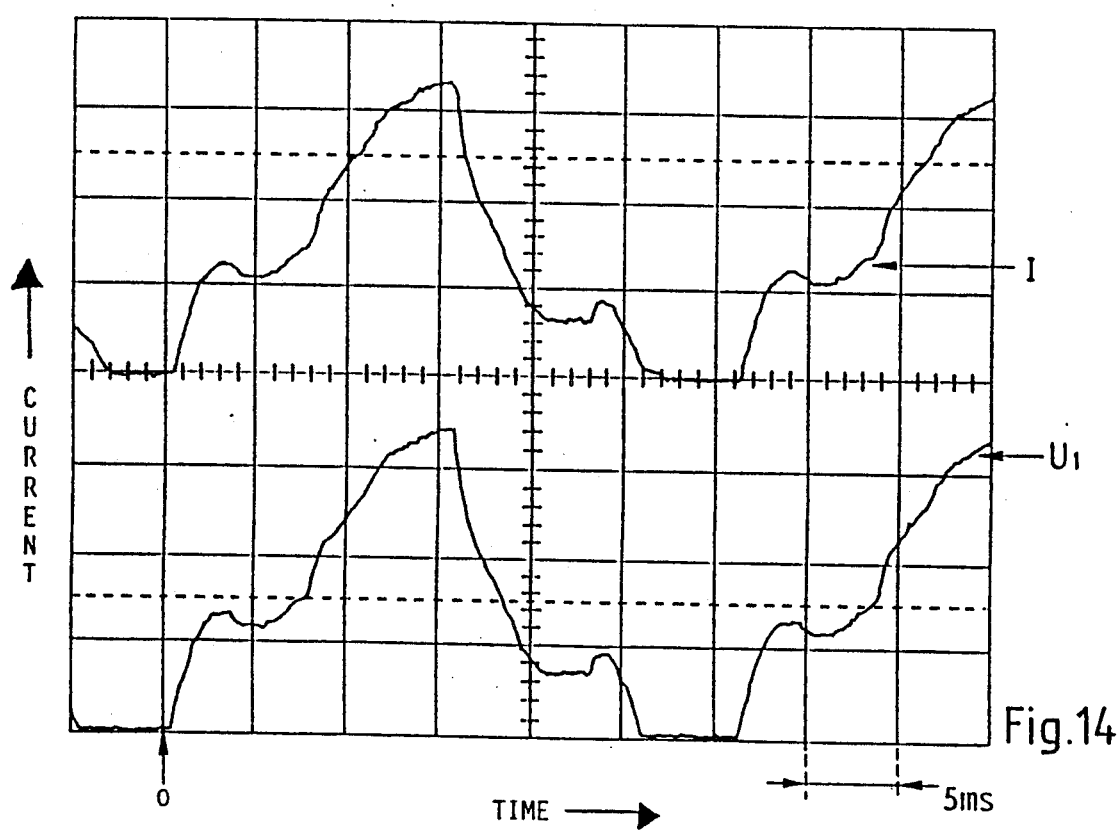
FIG. 14 shows curves of current as a function of time as measured in one winding that are to be reproduced and the voltage curve obtained at one output of the signal generator stage.

FIG. 14 shows the similarity between the current curve I to be reproduced in a similar application and the voltage curve U obtained at the output of one of the arbitrary signal generator boards.

It goes without saying that the foregoing description has been given by way of non-limiting example only and that those skilled in the art can put forward numerous variations thereon without departing from the scope of the invention.

What is claimed is:

1. A control law simulator for testing a stepper motor having N windings, said control law simulator comprising:
   signal generator means comprising means for generating N discrete signals, said N discrete signals being substantially identical in form and each having a period n, each period n comprises four steps, and each of said N discrete signals are offset from each other by n/4 in a sequential order;
   means for converting said discrete signals to analogue signals; and
   driver stage means for converting each of said N analogue signals to corresponding N current signals, each current signal corresponding to a respective one of said N discrete signals, each current signal energizing a respective one of said N windings of said stepper motor.

2. The control law simulator of claim 1 wherein said signal generator means further comprises:

N identical triggerable memory units, each said triggerable memory unit storing in a sequential order cyclic sequences of m digital data values of said period n, each of said cyclic sequences of m digital values corresponding to a respective one of the values of said N discrete signals;

computation means for generating said cyclic sequences and for simultaneously triggering each of said N identical triggerable memory units, each triggerable memory unit outputting in a sequential order said digital data values to generate N sets of digital data values; and digital-to-analogue converters connected to each of said N identical triggerable memory units, each of said digital-to-analogue converters converting said digital data values output from said triggerable memory unit to which it is connected to a corresponding analogue voltage signal.

3. The control law simulator of claim 2 wherein said computation means comprises:

a clock module for generating clock signals at a frequency f;

a central unit for generating said cyclic sequences, said central unit being connected to said clock module for generating trigger signals in response to said clock signals, said trigger signals simultaneously triggering said N identical triggerable memory units to sequentially output said digital data values at said frequency f;

a central unit memory connected to said central unit for storing operational data for said central unit; and an input/output peripheral device connected to said central unit for entering user information into said central unit memory.

4. The control low simulator of claim 3 wherein said driver stage means comprises:

N identical voltage-to-current converters, each of said N identical voltage-to-current converters having an input connected to a respective one of said digital-to-analogue converters and an output connected to a respective one of said N windings of said stepper motor.

5. The control low simulator of claim 4 wherein said N windings of said stepper motor are four windings, said N identical triggerable memory units are four identical triggerable memory units, said N digital-to-analogue converters are four digital-to-analogue converters and said N discrete analogue signals are four discrete analogue signals.

6. The control low simulator of claim 5 wherein said N identical voltage-to-current converters comprise:

a first set of four voltage-to-current converters having their outputs connectable to a respective one winding of a stepper motor having four windings;

a second set of two voltage-to-current converters having their output connectable to a respective one winding of a stepper motor having two windings; and a switching circuit for selectively connecting one of each said output of said four digital-to-analogue converters to an input of a respective one of said four voltage-to-current converters and one of each said output of a selected two of said four digital-to-analogue converters to an input of a respective one of said two voltage-to-current converters.

7. The control low simulator of claim 6 wherein said switching circuit is controlled by said computation means.

8. The control low simulator of claim 4 wherein said N identical voltage-to-current converters are carried by a second common circuit board.

9. The control law simulator of claim 4 wherein said driver stage means is connectable to a stepper motor having two windings, each voltage-to-current converter comprising:

an operational amplifier having an inverting input, a non-inverting input, and an output, said non-inverting input receiving said analogue signal output by its connected digital-to-analogue converter, said output being connectable to a positive terminal of a respective one of said two windings, said inverting input being connectable to a negative terminal of said respective one winding, and a resistor connecting said inverting input to ground.

10. The control law simulator of claim 4 wherein said driver stage means is connectable to a stepper motor having four windings, each voltage-to-current converter comprising:

an operational amplifier having an inverting input, a non-inverting input, and an output, said non-inverting input receiving said analogue signal generated by its connected digital-to-analogue converter;

a metal oxide semiconductor transistor (MOS) having a gate connected to said output of said operational amplifier, a source connected to a respective one of said four windings, and a drain connected to said inverting input of said operational amplifier; and a resistor connecting said drain of said MOS transistor and said inverting input of said operational amplifier to ground.

11. The control law simulator of claim 3 wherein said frequency f of said clock signals generated by said clock module is programmable.

12. The control law simulator of claim 2 wherein each of said N discrete digital-to-analogue converters and said triggerable memory unit to which it is connected are carried by a first common circuit board.

13. The control law simulator of claim 2 wherein said period n has at least 100 cyclic sequences of digital data values.

14. The control law simulator of claim 2 wherein said period n has at least 1000 cyclic sequences of digital data values.

15. A control law simulator for testing a stepper motor having N windings, N being an integer, said control law simulator comprising:

signal generator means comprising:

N identical triggerable memory units for storing in a sequential order N respective cyclic sequences of m digital data values, each sequence having a period n, each period n having s steps, m and n and s being integers with m greater or equal to n and s being a submultiple of n, said N respective cyclic sequences being substantially identical to each other but being offset from each other by n/s;

computation and triggering means comprising means for generating, before a test of said stepper motor, said cyclic sequences to be stored in said triggerable memory units and means for simultaneously triggering, during a test of said stepper motor, said N identical triggerable memory units at a frequency f, said N identical triggerable memory units outputting in a sequential order said N respective cyclic sequences of digital data values, to generate N sets of digital data values having a frequency f/n: and digital-to-analogue converters connected to each of said N identical triggerable memory units, each of said digital-to-analogue converters converting said digital data values output from said triggerable memory unit to which it is connected to a corresponding analogue voltage signal having said frequency f/n; and driver stage means for converting each of said N analogue voltage signals to corresponding N current signals, each current signal corresponding to a respective one of said analogue voltage signals, each current signal energizing a respective one of said N windings of said stepper motor;

whereby said N windings of said stepper motor are energized by N respective current signals corresponding to N respective cyclic sequences of digital data values.

16. The control law simulator of claim 15 wherein s equals 4.

17. The control law simulator of claim 15 wherein said computation means comprises:

a clock module connected to said triggerable memory units for generating clock signals at said frequency f;

a central unit for generating said cyclic sequences from operational data, said central unit being connected to said clock module for generating trigger signals to simultaneously trigger said N identical triggerable memory units;

a central unit memory connected to said central unit for storing operational data for said central unit; and an input/output peripheral device connected to said central unit for entering user information into said central unit memory.

18. The control law simulator of claim 15 wherein N equals 4 and wherein said driver stage means comprises:

a first set of four voltage-to-current converters having their outputs connectable to respective windings of a stepper motor having four windings;

a second set of two voltage-to-current converters having their outputs connectable to respective windings of a stepper motor having two windings; and said control law simulator further comprising a switching circuit for selectively connecting either said first set to all four outputs of said four digital-to-analogue converters or said second set to two predetermined of said outputs of said four digital-to-analogue converters. whereby said control law simulator can test stepper motors with either four or two windings.

* * * * *

UNITED STATES PATENT AND TRADEMARK OFFICE
CERTIFICATE OF CORRECTION

PATENT NO. : 5,270,961            Page 1 of 2

DATED      : December 14, 1993

INVENTOR(S) : Thierry Bajat and Jean-Jacques Digoin

It is certified that error appears in the above-identified patent and that said Letters Patent is hereby corrected as shown below:

Title Page, item [57], line 1, delete "low" insert ---- law ----.

Title Page, ite, [57], line 14, delete "low" insert ---- law ----.

Column 5, line 50, delete "the" and insert after "of" ---- the--.

Column 3, line 35, "52" should read --53--.

Column 6, line 20, after "universal" insert ---- simultation ----.

Column 6, line 29, after "to" insert ---- the analogue power or driver stage. ----.

Column 10, line 12, delete "FIGS." insert ---- FIG. ----.

Column 11, line 37, delete "low" insert ---- law ----.

Column 11, line 45, delete "low" insert ---- law ----.

Column 11, line 53, delete "low" insert ---- law ----.

Column 12, line 1, delete "low" insert ---- law ----.

Column 12, line 4, delete "low" insert ---- law ----.

Column 13, line 4, delete "f/n:" insert ---- f/n; ----.

UNITED STATES PATENT AND TRADEMARK OFFICE
CERTIFICATE OF CORRECTION

PATENT NO.   :   5,270,961
DATED        :   December 14, 1993
INVENTOR(S)  :   Thierry Bajat and Jean-Jacques Digoin It is certified that error appears in the above-indentified patent and that said Letters Patent is hereby corrected as shown below:

Column 14, line 26, after "converters" delete "." insert —,—.

Signed and Sealed this

Sixteenth Day of August, 1994

*Attest:*

BRUCE LEHMAN

*Attesting Officer*     *Commissioner of Patents and Trademarks*